(No Model.)
F. L. SIGLOW.
BICYCLE CRANK AND CRANK AXLE.
No. 596,550. Patented Jan. 4, 1898.
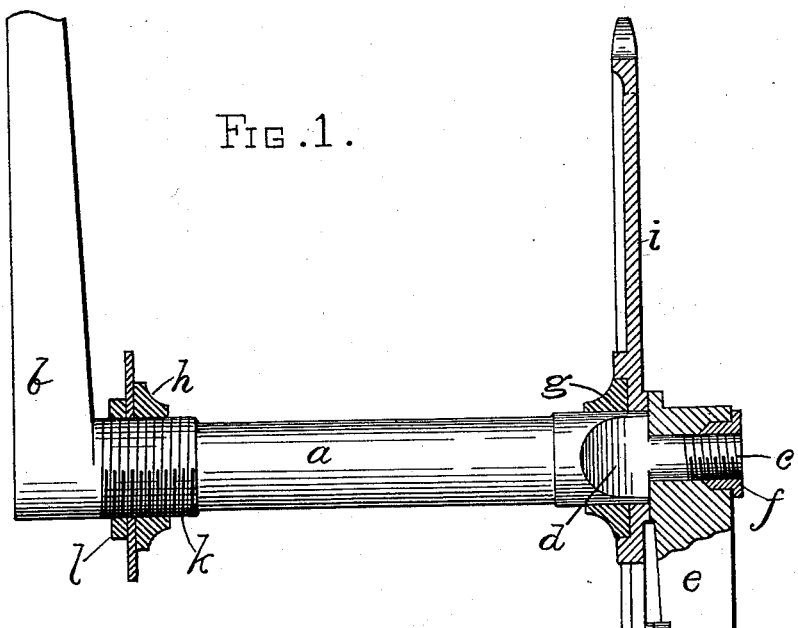
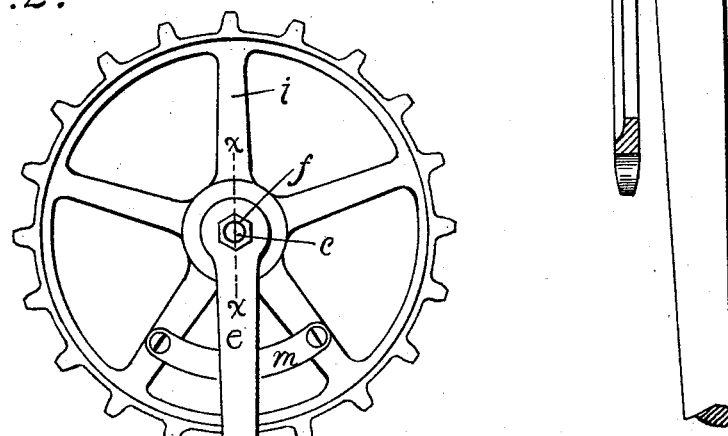
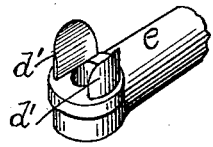
WITNESSES:
David E. Watter
L. E. Brown
INVENTOR:
Fred L. Siglow
By Huron Hall
His Attorney

UNITED STATES PATENT OFFICE.

FRED L. SIGLOW, OF TOLEDO, OHIO.

BICYCLE CRANK AND CRANK-AXLE.

SPECIFICATION forming part of Letters Patent No. 596,550, dated January 4, 1898.

Application filed March 3, 1897. Serial No. 625,814. (No model.)

*To all whom it may concern:*

Be it known that I, FRED L. SIGLOW, a citizen of the United States, residing at Toledo, Lucas county, Ohio, have invented certain new and useful Improvements in Bicycle Cranks and Crank-Axles, of which the following is a specification.

My invention relates to a bicycle crank and crank-axle; and its object is to provide a device which shall be simple, cheap, light, and strong and in which the parts may be easily assembled and adjusted. I attain these objects by means of the device hereinafter described, and shown and illustrated in the accompanying drawings, made part hereof, in which—

Figure 1 is a front elevation of my device, partly in section, taken on line $x\,x;$ Fig. 2, a side or end view of the same, and Fig. 3 a perspective view of the inner end of one of the cranks hereinafter referred to.

Like letters of reference indicate like parts in the several views.

In the drawings, $a$ is the crank-shaft, which is formed integral at one end with one of the cranks $b$ and which at its other end terminates in a screw-threaded bolt $c$, of less diameter than the crank-shaft. At this end of its larger diameter the crank-shaft is beveled or chamfered upon two opposite sides, as at $d$, down to the diameter of the bolt. The crank-arm $e$ is bored at its hub to receive the projecting bolt portion $c$ of the axle, this bore at its outer end being enlarged to receive the nut $f$, the angular head of which projects but slightly beyond the outer face of the crank-arm $e$. Projecting inwardly from and formed integral with the hub of the crank-arm $e$ are two lips or flaps $d'\,d'$, (see Fig. 3,) which coincide with and fit upon the chamfered end surfaces $d$ of the axle.

$g\,h$ are ball-bearing rings fitted snugly upon the axle $a$, the former being recessed and stationary within the hub of the sprocket-wheel $i$, the latter ring being movable and adjustable upon the opposite end of the axle, as a nut upon a threaded portion of the axle, formed as at $k$. A jam-nut $l$ serves to hold the adjusting-nut $h$ in its adjusted position. The usual arc $m$ serves to connect the crank-arm $e$ and the sprocket-wheel $h$.

The manner of assembling the parts and adjusting the same will now be obvious. First the jam-nut $l$ and the ball-bearing ring $h$ are screwed in place. The shaft $a$ is then passed through the sleeve of the crank-hanger, it being understood that the balls for the bearing $h$ and $g$ are in place. The ring $g$, the sprocket-wheel, and the crank $e$ are brought together, as shown, and are together slipped over the outer end of the shaft $a$, so that the lips or flaps $d'\,d'$ engage and fit upon the chamfered end of the shaft. The nut $f$ is now screwed in place and the operation is complete.

It will be seen that it is necessary that the ball-bearing ring $g$ should be held in place rigidly and against rotation. This is accomplished by means of the lips $d'\,d'$, which are slightly resilient and which as they are forced upon the wedge-like surfaces $d$ are spread somewhat apart within the ring $g$, thus by friction holding the ring firmly in place.

Having described my invention, what I claim, and desire to secure by Letters Patent, is—

An axle, or shaft, chamfered or beveled surfaces at the end thereof, a crank, inwardly-projecting, resilient lips or flaps upon the hub of said crank coinciding with and engaging said chamfered or beveled surfaces, a member embracing said lips or flaps, and means for securing said crank upon said axle, whereby when said lips or flaps are forced upon said beveled surfaces the spread of the lips or flaps holds said embracing member in place.

FRED L. SIGLOW.

In presence of—
   GEO. W. BLAKE,
   L. E. BROWN.